Sept. 23, 1969  S. PURE ET AL  3,469,229
UNDERWATER ACOUSTIC NAVIGATION SYSTEM
Filed April 26, 1961  2 Sheets-Sheet 1
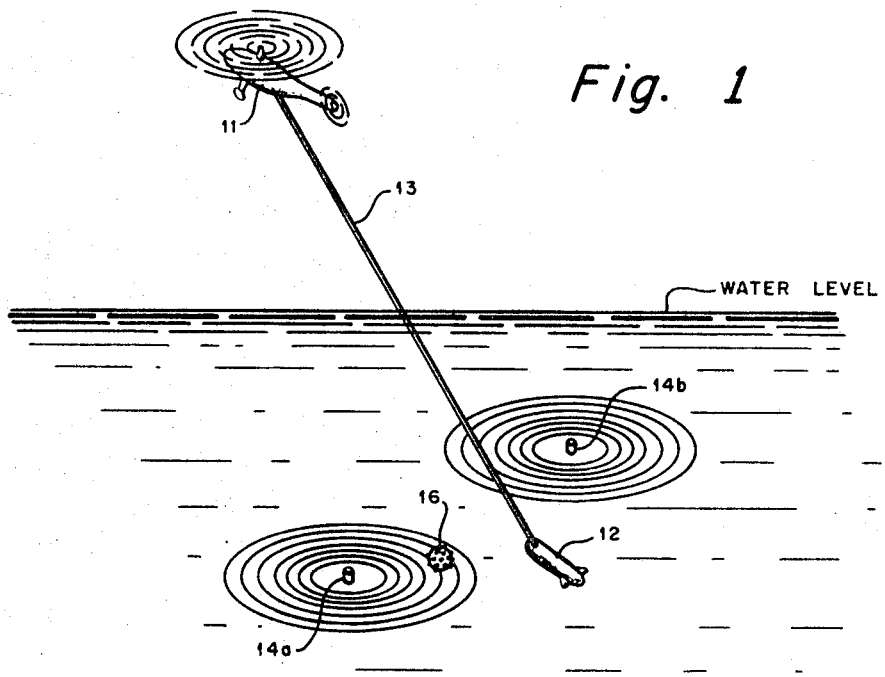
Fig. 1
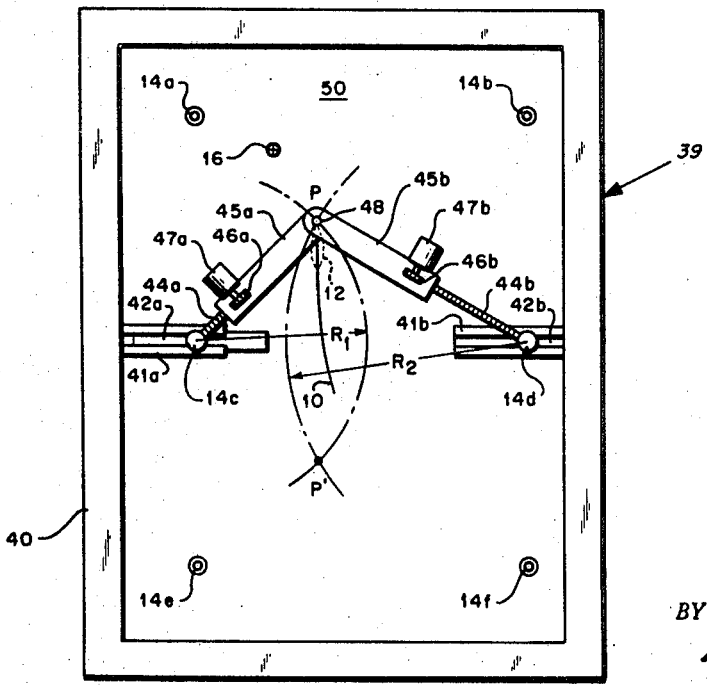
Fig. 2
INVENTORS
SAMUEL PURE
JOHN D. WALLACE
BY 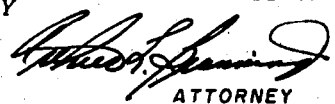
ATTORNEY

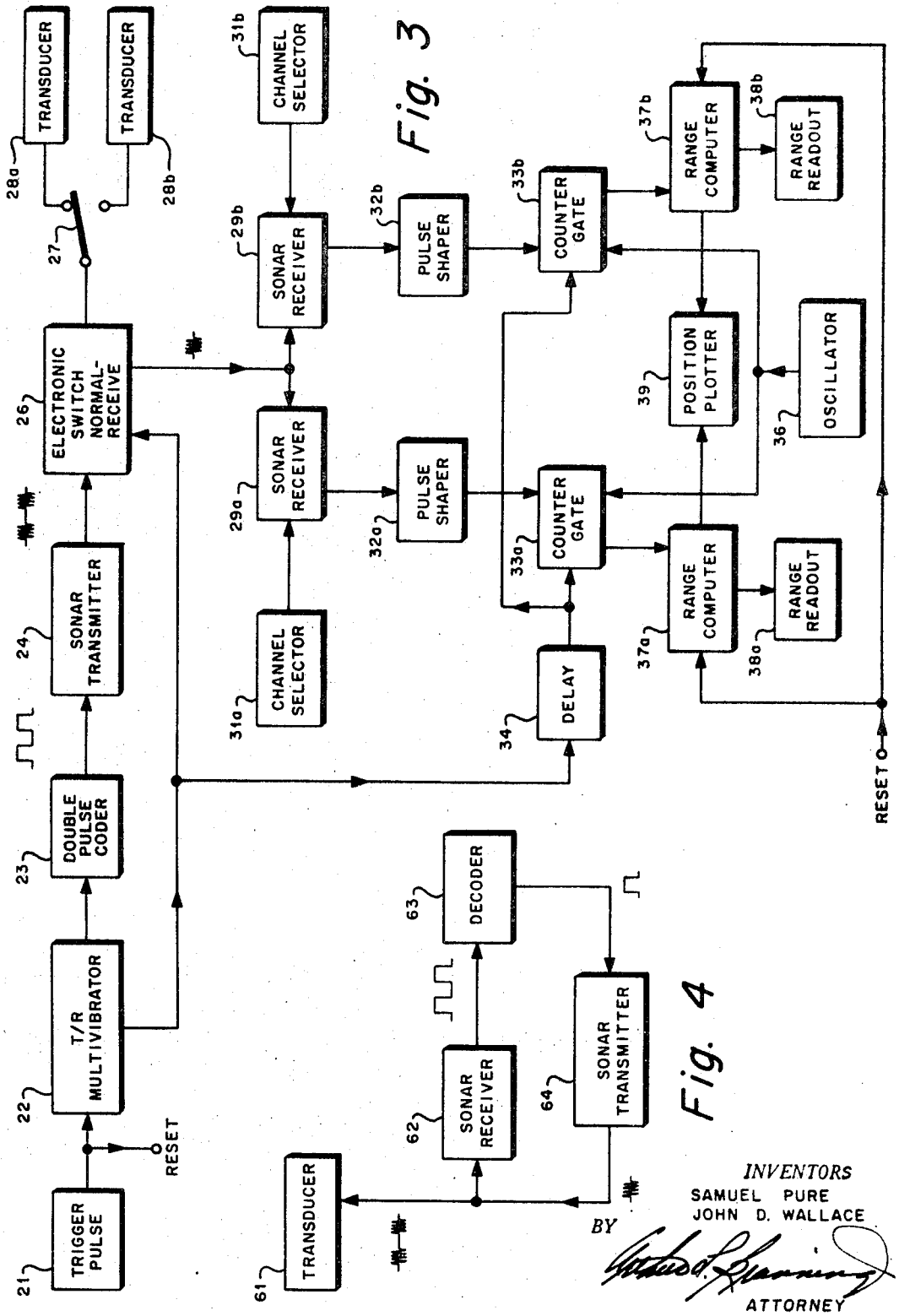

United States Patent Office 3,469,229
Patented Sept. 23, 1969

3,469,229
UNDERWATER ACOUSTIC NAVIGATION SYSTEM
Samuel Pure, Rydal, Pa., and John D. Wallace, Princeton, N.J., assignors to the United States of America as represented by the Secretary of the Navy
Filed Apr. 26, 1961, Ser. No. 106,418
Int. Cl. G01s 9/66
U.S. Cl. 340—3         4 Claims

ABSTRACT OF THE DISCLOSURE

An acoustic navigation system is which a plurality of pairs of acoustic transponders are air dropped or otherwise deposited beneath the surface of a waterway at known locations. A chart-making vessel, equipped with acoustic interrogating, range measuring and recording apparatus traverses the waterway continuously and simultaneously determining the range to selected transponders and constructing a plot on a chart of the vessel course with respect to the transponders. The location of other objects in the waterway is recorded along with the vessel course whereby the resultant chart may be employed to determine a safe course to be followed by appropriately equipped vessels in the waterway having reference only to the transponders for position information.

---

The invention described herein may be manufactured and used by or for the Government of the United States of America for governmental purposes without the payment of any royalties thereon or therefor.

The present invention relates to navigation systems and methods and more particularly to underwater acoustic navigation systems and methods characterized by the provision of selfcontained references, whereby safe navigation may be accomplished in waterways where conventional marine navigation aids are not available.

Landing of personnel and supplies by ship onto territory which has been recently in enemy hands requires that the water be completely cleared of mines or that a safe channel be cleared and marked for navigation. The task of mine detection, classification, identification, and neutralization requires accurate navigation to insure that the area of interest is fully covered. The omission of any portion of the area might nullify the whole mine countermeasure effort. Too much overlap between successive mine hunting passes is also undesirable, since it will result in undue delays in the operation. Precise mapping of the area and charting the course of the mine hunting vehicle are essential.

The present invention provides a relatively secure navigation system and method adapted to airborne assault mine countermeasure missions where standard navigation aids cannot be used.

While an illustrative use of the invention has been set forth above, it is to be understood that the invention has more general utility. For example, the invention may be employed to provide accurate ship navigation in any waterway where conventional marine aids to navigation are not available. Further, since the invention provides a degree of precision in navigation not heretofore obtainable, it may be employed in improved waterways to accomplish safe navigation through a narrower channel than was heretofore considered practical.

In essence, according to the invention, a plurality of pairs of acoustic transponders are air-dropped or otherwise deposited beneath the surface of a waterway at known locations. Thereafter a chart making vessel equipped with acoustic interrogating, range measuring, and recording apparatus traverses the waterway with the above described apparatus functioning to continuously and simultaneously determine range to selected transponders and to construct a plot of the vehicle course with respect to the transponders on a chart. During this operation, other apparatus, not per se forming a part of this invention, is employed to locate, with respect to the vehicle, mines and/or other hazards to navigation. The locations of these objects are recorded along with the vehicle course whereby the resultant chart may be employed to determine a safe course to be followed by appropriately equipped vessels in the waterway having reference only to the transponders for position information.

As used herein, the terms plot and chart are intended to apply to the recording or storage of data on any suitable media in a form permitting reproduction.

In one contemplated form of the invention, acoustic interrogating, sonar receiving, data processing, and range computing circuitry may be installed in a bottom contour following body towed by a helicopter with indicating, recording and control devices being installed in the helicopter. The indicators and control devices for object locating systems may likewise be installed in the helicopter with the remainder of these systems being installed in the towed body.

Accordingly, it is an object of the present invention to provide marine navigation systems and methods wherein reliance upon external references or landmarks is not required.

It is another object of the present invention to provide a navigation system and method the operation of which is not susceptible to detection and interference.

It is another object of the present invention to provide an underwater acoustic navigation system and method wherein a plurality of pairs of acoustic transponders deposited at known locations in a waterway are utilized as the sole reference to obtain position information.

Other objects and many of the attendant advantages of the present invention will be readily appreciated as the same becomes better understood by reference to the following detailed description when considered in connection with the accompanying drawings in which like reference numerals designate like parts throughout the figures thereof and wherein:

FIG. 1 is a diagram illustrating the invention as embodied in a helicopter towed bottom contour following body system, FIG. 2 is a schematic showing of an illustrative plotting mechanism which may be used in practicing the invention, FIG. 3 is a block diagram of a portion of an embodiment of the invention, and FIG. 4 is a simplified block diagram of an acoustic transponder comprising the remainder of the embodiment of the invention shown in part in FIG. 3.

Referring now to FIG. 1, in one contemplated form of the invention, a bottom contour following body 12 is suspended by a cable 13 from a helicopter 11 to be towed thereby. Installed within body 12 is an acoustic interrogator. The interrogator is operative to activate a plurality of pairs of acoustic transponders previously air-dropped or otherwise deposited in the waterway to be charted. One pair of transponders 14a, 14b is shown in FIG. 1.

All transponders within range of the interrogator transpond but at different frequencies to permit selection of and discrimination between transponders.

Circuitry is provided in body 12 to continuously determine range with respect to each of a pair of selected transponders as a function of the elapsed time between transmission of an interrogating signal and receipt of reply signals from the transponders. The measured range to each transponder is displayed by an appropriate indicator located in helicopter 11 and signals proportional to the range to each transponder are applied continuously to a plotting mechanism installed within the helicopter.

Operation of object locating equipment, such as mine hunting sonar, installed within body 12 permits the concurrent determination of the locations of various objects of interest to safe navigation with respect to the position of body 12, such as a mine 16. The locations of these objects are plotted along with the course of towed body 12 by use of the plotting mechanism (FIG. 2).

Successive interrogation of transponder pairs located along the waterway permits the construction of a complete chart of the waterway showing objects therein of interest to navigation referenced to the position of the transponder pairs.

After reproduction, the chart may be utilized by suitably equipped vessels to safely navigate the waterway.

The detailed operation of the invention may be best understood by reference to FIGS. 3 and 4 which in block diagram form together illustrate an embodiment thereof.

Referring now to FIG. 3, a trigger pulse generator 21 supplies trigger pulses at an adjustable repetition rate to a transmit-receive monostable multivibrator 22. The single pulse output signal from multivibrator 22 is concurrently coupled to an encoder 23, here illustrated as a double pulse coder, and, for purposes to be later described, to an electronic switch 26 and through a delay line 34 to the enabling circuits of a pair of counter gates 33a, 33b.

The double pulse signal from encoder 23 is coupled to modulate sonar transmitter 24 which thereupon functions to provide an output signal comprising two bursts of acoustic energy corresponding to the pulse duration and the interpulse period of the encoded modulating signals.

The output signal from sonar transmitter 24 is coupled through electronic switch 26 and through a switching means 27, which may comprise an electromagnetically operated relay, to one of a pair of electro-acoustic transducers 28a, 28b each of which functions both as transmitting and as receiving elements.

Transducers 28a, 28b are directional and may for example, provide one hundred eighty degree radiation patterns. The transducers are arranged in towed body 12 whereby the radiation pattern of one is oriented in the direction of travel of the towed body and the radiation pattern of the other is reciprocally oriented to permit cross-correlation of range signals from adjacent transponder pairs, as will be more fully described below.

Electronic switch 26 is normally in the receive condition (coupling transducers 28a, 28b, to sonar receivers 29a, 29b) but is momentarily actuated to the transmit condition upon receipt of a pulse from multivibrator 22.

Referring to FIG. 4, which is a simplified block diagram showing of circuitry of a transponder such as 14a (FIG. 1), the acoustic interrogating signal from transducer 28a or 28b is received by a non-directional electroacoustic transducer 61 which provides a corresponding electrical output signal coupled to the input circuitry of a sonar receiver 62. Sonar receiver 62 provides an output signal corresponding to the signal from encoder 23 (FIG. 3) which is coupled to a decoder 63.

Decoder 63 may comprises a coincidence type circuit operative to provide an output signal only when the input signal thereto is properly encoded, for example, when the output signal from sonar receiver 62 comprises a pulse pair of selected duration and interpulse period.

A sonar transmitter 64 is modulated by the signal from decoder 63 and functions to provide a sonar signal of preselected frequency coupled to transducer 61 which emits an acoustic pulse to complete the transponding cycle.

The sonar transmitters in the transponders operate at different frequencies to permit discrimination between transponders which are within range of the interrogator equipment above described (FIG. 3).

Referring again to FIG. 3, the reply signals received from all transponders within range are coupled from transducer 28a or 28b through switch means 27 and electronic switch 26 (now in a receive condition) and applied conjointly to the input circuits of sonar receivers 29a, 29b. Sonar receivers 29a, 29b are respectively tuned by operation of channel selectors 31a, 31b, located in helicopter 11, to respectively pass only signals received from the selected transponder pair.

The demodulated reply signals from the selected transponders are coupled from the output circuits of sonar receivers 29a, 29b through pulse shapers 32a, 32b to the disabling circuits of counter gates 33a, 33b.

Pulse shapers 32a, 32b are needed to correct the distortion in the demodulated reply signals resulting from frequency selective attenuation. The higher frequency components of an acoustic wave are more attenuated by passage through a water medium than are the lower frequency components. Since, as will be more apparent as the description below is considered, range determination in the illustrated embodiment of the invention is essentially a time measurement, a fairly clean pulse is required for application to the counter gates in order to permit range determination of acceptable accuracy. While not shown in FIG. 4, it is to be understood that similar pulse shaping circuitry may be included in the output circuit of sonar receiver 62.

Counter gates 33a, 33b may be of the type described in copending application Ser. No. 11,937, of Samuel Pure, filed Feb. 29, 1960, for Transistorized Gating Circuit, now U.S. Patent 3,128,393 issued April 7, 1964. The nature of the counter gates are fully set forth in the referenced application, but, to facilitate an understanding of the present invention, the mode of operation of the gates will be briefly set forth below.

The counter gates are normally in a closed condition but are opened upon appliaction thereto of an enabling pulse from transmit-receive multivibrator 22 coupled through delay line 34. The delay provided by delay line 34 is approximately equal to the sum of the interpulse period of the encoded signals and system delays occurring in the interrogator circuitry of FIG. 3 and the transponder circuitry of FIG. 4. Counter gates 33a, 33b remain in an open condition until receipt of a decoded reply pulse from sonar receivers 29a, 29b coupled through pulse shaping circuits 32a, 32b. During the intervals that the counter gates are open, signals from a sound velocity compensated oscillator 36, functioning as clock pulse generator, are coupled through the counter gates and applied to range computers 37a, 37b.

Sound velocity compensated oscillator 36 embodies a sing-around oscillator synchronizing circuit of the type described in National Bureau of Standards Report 2702, Jan. 2, 1953, entitled "A Sing-Around Ultrasonic Velociometer for Liquids," by Martin Greenspan and Harold E. Tschiegg. In this circuit, the medium, in this case water, through which the acoustic waves are to be propagated comprises an ultrasonic delay line in the sing-around circuit. Thus, in the present invention, range measurements are automatically compensated with respect to variation in the propagation characteristics of the transmission media.

Continuing with the description of FIG. 3, range computers 37a, 37b and range readout circuits 38a, 38b may be substantially like those disclosed in copending application Ser. No. 856,625, of Samuel Pure filed Dec. 1, 1959, for Indicating System, now U.S. Patent 3,169,238 issued Feb. 9, 1965. The range computers are essentially cycle counters and function to position counter wheels in range readout circuits 38a, 38b and to provide voltages derived from a potentiometer or a synchro, which vary in accordance with the number of cycles received from oscillator 36 during the intervals of time that counter gates 33a, 33b are open. The voltages are thus proportional to the ranges to the transponders. At the beginning of each cycle of operation, the output signal from trigger pulse generator 21 is applied to the reset circuits of range computers 37a, 37b to initiate a new cycle count and range determination.

The range dependent signals from range computers 37a, 37b are applied to a position plotter 39 to thereby record a continuous track of the course of towed body 12 in the waterway being investigated. FIG. 2, for illustrative purposes, shows a recording apparatus in schematic form.

Referring now to FIG. 2, position plotter 39 is shown enclosed within a casing 40 and supporting a chart 50 which, while not so shown, may comprise a geographical representation of the waterway being investigated. The positions of transponder pairs are recorded upon the chart by any suitable means and are indicated at 14a, 14b, 14c, 14d, 14e, and 14f in FIG. 2. It is to be understood that the showing of three transponder pairs is illustrative only since, depending upon the scale of the chart, two or more pairs may be shown on the exposed portion thereof.

A pair of slide mechanisms 41a, 42a and 41b, 42b are secured to casing 40 to permit two degrees of freedom thereof whereby the pivot points of a pair of rotatable pen arms 45a, 45b may be positioned over the marked locations of the transponder pair then being interrogated (14c, 14d are indicated in FIG. 2). Pen arms 45a, 45b are coupled to racks 44a, 44b by pinions 46a, 46b driven by motors 47a, 47b which are respectively coupled to be energized by the range signals from range computers 37a, 37b through a conventional servo system (not shown).

A marking pen or stylus (not shown) is located at the common pivot 8 of pen arms 45a, 45b whereby the pen or stylus is positioned adjacent one intersection P of a pair of circles having radii $R_1$, $R_2$, respectively proportional to the range between the interrogator and each of the selected transponder pair. The stylus is thus positioned on chart 50 in accordance with the instantaneous position of towed body 12 with respect to the selected transponder pair.

Mathematically, the towed body could be located at the other intersection P' of the circles. However, the directive characteristics of transducers 28a, 28b function to remove the mathematical ambiguity.

While the course of the towed body is being inscribed upon chart 50, objects of interest to navigation, such as mines, are being located by operation of object detecting and locating apparatus, such as mine hunting sonar, installed in towed body 12 with the positions thereof displayed upon appropriate indicators installed in helicopter 11. The locations of these objects may be manually or otherwise inscribed upon chart 50 as indicated by the mine representation 16 in FIG. 2.

It is to be understood that commercial plotting apparatus such as X-Y plotters, coupled through suitable coordinate conversion means to range computers 37a, 37b, may be employed in place of the polar coordinate plotter illustrated in FIG. 2. Where the capabilities of the recording apparatus permit, the location of the navigation hazards as well as the course of the towed body may be automatically recorded.

As mentioned above, while chart recording has been described for illustrative purposes, it is to be understood that other recording media, such as a magnetic drum or a magnetic core matrix, may be employed.

Continuing with the description of FIG. 2, when the towed body has traversed a convenient distance along the waterway, pen arms 45a, 45b may be translated to coincide with the marked locations of the next transponder pair to be interrogated or the chart may be translated with respect to the open mechanism.

Periodically, to insure accuracy, plotting may be accomplished with respect to a transponder pair previously interrogated by operation of switching means 27 and suitable adjustment of the plotting mechanism.

At the conclusion of the charting operation, the chart or recording may be reproduced in any desired quantity and a safe course may be marked thereon. Thereafter, vessels employing apparatus similar to that above described may safely navigate the waterway by using the apparatus in the manner described without need for other navigation apparatus.

While the navigation systems and methods of the present invention are primarily intended for use in waterways where conventional marine navigation aids are not available, it is to be understood that, by virtue of the high order of precision obtainable by use of the present invention, it may likewise be desired to employ the invention in improved waterways and harbors.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An acoustic navigation system comprising: an interrogator-receiver comprising, variable repetition rate trigger pulse generating means, single pulse generating means coupled to be energized by said trigger pulse generating means, pulse coding means coupled to be energized by said single pulse generating means, a sonar transmitter coupled to be modulated by said pulse coding means, electro-acoustic transducer means, a pair of tunable sonar receivers, and circuit means coupling said transmitter and the input circuits of said receivers in common to said transducer means; a plurality of pairs of acoustic transponders deposited in known locations in a waterway, each of said transponders comprising, an electro-acoustic transducer, a sonar receiver having the input circuit thereof coupled to said transducer, pulse decoding means having the input circuit thereof coupled to the output circuit of said sonar receiver, a sonar transmitter operable at a selected frequency coupled to be modulated by the ouput signal from said decoding means, and circuit means coupling the output signals from said sonar transmitter to said transducer; a pair of counter gates each having an enabling circuit coupled in common to said single pulse generating means and a disabling circuit coupled to said sonar receivers, a sound velocity compensated oscillator, a pair of range computing means respectively coupled through said counter gates to said sound velocity compensated oscillator, each operative to generate a signal proportional to the number of oscillations received during the intervals of time transpiring between the occurrence of the enabling signal from said single pulse generator and the disabling signals received from said sonar receivers to thereby provide signals proportional to ranges; a pair of indicating means respectively coupled to be actuated by the range signals from said range computers; and means coupled to be energized by the range signals from said range computers operative to continuously record the position of said interrogator-transmitter with respect to the locations of said selected pair of transponders.

2. The combination of claim 1 wherein said electro-acoustic transducer means comprises a pair of directional electro-acoustic transducers, and wherein said circuit means to couple said sonar transmitter and the input circuits of said pair of sonar receivers to said transducer means comprises a terminal, first switching means operable to selectively couple said terminal to one of said pair of transducers, and second switching means coupled to be controlled by said single pulse generator operable to selectively couple said transmitter or the input circuits of said receivers to said terminal.

3. An acoustic navigation system comprising: an interrogator-reciver comprising, variable repetition rate trigger pulse generating means, single pulse generating means coupled to be energized by said trigger pulse generating means, pulse coding means coupled to be energized by said single pulse generating means, a sonar transmitter coupled to be modulated by said pulse coding means, electro-acoustic transducer means, a pair of tunable sonar receivers, and circuit means coupling said transmitter and the input circuits of said receivers in common to said transducer means; a plurality of pairs of acoustic transponders each operative to reply at a selected frequency to interrogations; a pair of counter gates each having an enabling circuit coupled in common to said single pulse generating means and a disabling circuit coupled to said sonar receivers, a sound velocity compensated oscillator, a pair of range computing means respectively coupled through said counter gates to said sound velocity compensated oscillator, each operative to generate a signal proportional to the number of oscillations received during the intervals of time transpiring between the occurrence of the enabling signal from said single pulse generator and the disabling signals received from said sonar receivers to thereby provide signals proportional to ranges; a pair of indicating means respectively coupled to be actuated by the range signals from said range computers; and means coupled to be energized by the range signals from said range computers operative to continuously record the position of said interrogator-transmitter with respect to the locations of said selected pair of transponders.

4. The combination of claim 3 wherein said electro-acoustic transducer means comprises a pair of directional electro-acoustic transducers, and wherein said circuit means to couple said sonar transmitter and the input circuits of said pair of sonar receivers to said transducer means comprises a terminal, first switching means operable to selectively couple said terminal to one of said pair of transducers, and second switching means coupled to be controlled by said single pulse generator operable to selectively couple said transmitter or the input circuits of said receivers to said terminal.

References Cited

UNITED STATES PATENTS

| | | | |
|---|---|---|---|
| 2,679,043 | 5/1954 | Lipkin et al. | 343—6.5 X |
| 3,076,519 | 2/1963 | Alsabrook | 340—1 X |
| 3,117,317 | 1/1964 | Kenyon | 343—13 |
| 3,213,410 | 10/1965 | Hagemann | 340—3 X |

RICHARD A. FARLEY, Primary Examiner

U.S. Cl. X.R.

340—6; 343—6.5